United States Patent [19]

Babb et al.

[11] Patent Number: 5,007,450

[45] Date of Patent: Apr. 16, 1991

[54] ADD-ON LIQUID OVERFLOW SHUT-OFF VALVE FOR TANK

[76] Inventors: Franklyn P. Babb; Matthew T. Babb, both of 1666 S. Santa Fe, Vista, Calif. 92084

[21] Appl. No.: 579,539

[22] Filed: Sep. 10, 1990

Related U.S. Application Data

[63] Continuation-in-part of Ser. No. 538,524, Jun. 15, 1990, abandoned.

[51] Int. Cl.$^5$ .................. F16K 43/00; F16K 31/32; F16K 33/00
[52] U.S. Cl. .................. 137/315; 137/413; 137/426; 137/447; 137/557; 137/625.47; 137/887; 251/286; 340/625; 417/40; 417/41
[58] Field of Search ............ 137/315, 312, 412, 314, 137/326, 428, 447, 557, 625.46, 625.47, 887; 340/623, 624, 625; 417/40, 41; 251/286

[56] References Cited

U.S. PATENT DOCUMENTS

| | | | |
|---|---|---|---|
| 559,555 | 5/1896 | Williams | 137/428 |
| 609,544 | 8/1898 | Hipp | 137/447 |
| 927,368 | 7/1990 | Mauldin | 137/426 |
| 968,362 | 8/1910 | Keenan | 137/447 |
| 1,188,535 | 6/1916 | Ellis | 137/426 |
| 1,427,793 | 9/1922 | Emerson | 417/41 |
| 1,629,545 | 5/1927 | Sherman et al. | 137/447 |
| 2,847,025 | 8/1958 | Reitman | 137/426 |
| 4,612,949 | 9/1986 | Henson | 137/392 |
| 4,637,424 | 1/1987 | Morgan, III | 137/392 |
| 4,909,274 | 3/1990 | Rodriguez | 417/40 |

FOREIGN PATENT DOCUMENTS

| | | | |
|---|---|---|---|
| 2148868 | 3/1972 | Fed. Rep. of Germany | 417/41 |
| 20399 | of 1893 | United Kingdom | 137/447 |
| 828125 | 2/1960 | United Kingdom | 417/41 |

*Primary Examiner*—George L. Walton
*Attorney, Agent, or Firm*—John J. Murphey

[57] ABSTRACT

An add-on liquid overflow shut-off valve including a valve body, a float and an arm connecting the float to the body that is insertable in fully assembled form through a standard tank lid opening, and further including a flanged end on the valve body for engagement outside and above the rim of the opening and threads associated therewith to engage the periphery of the opening to anchor the body inside the interior of the tank and at the top thereof, pneumatic openings formed in the top flanged end in spaced-apart relation for connection respectively to a pressurized pneumatic source and a pneumatic-driven liquid pump arranged to pump liquid into the tank through another opening in the tank, first and second pneumatic passageways formed interior the body extending from the openings, a third pneumatic passageway formed in the body for interconnecting the first and second passageways, and a shaft pivotally received in the body, having a fourth pneumatic passageway formed therethrough for pneumatic alignment with the third pneumatic passageway when the liquid is below a predetermined level in the drum, the shaft having one end thereof exiting the valve body for connection through an extended arm to a float for causing rotation of the shaft as a function of the level of liquid in the tank and to allow pneumatic power to drive the pump and continue to deliver liquid into the tank and then to rotate into a position shutting off the pneumatic power to the pump when the level of the liquid reaches the predetermined level.

24 Claims, 3 Drawing Sheets

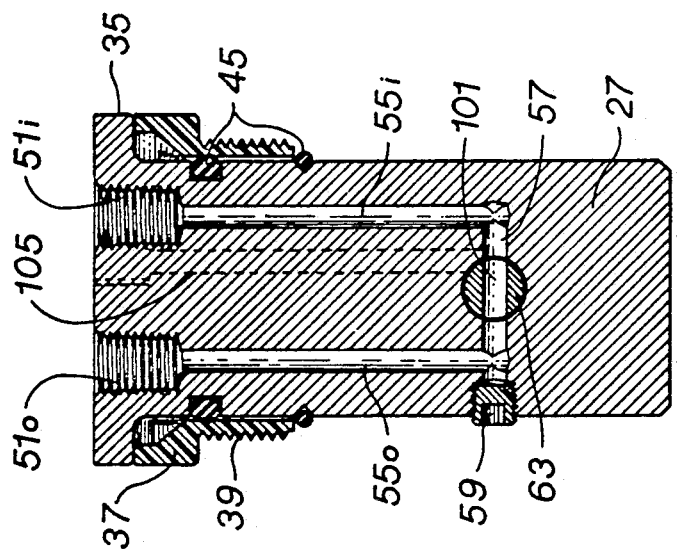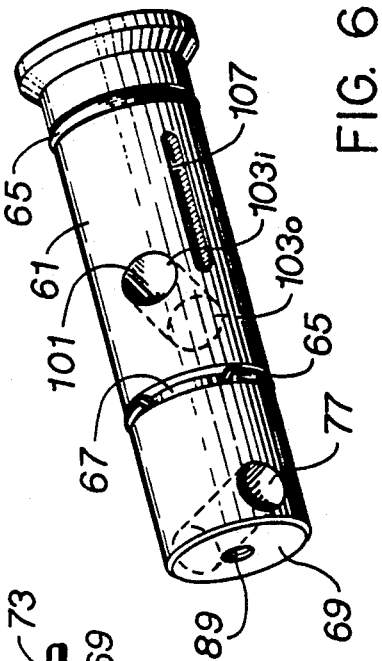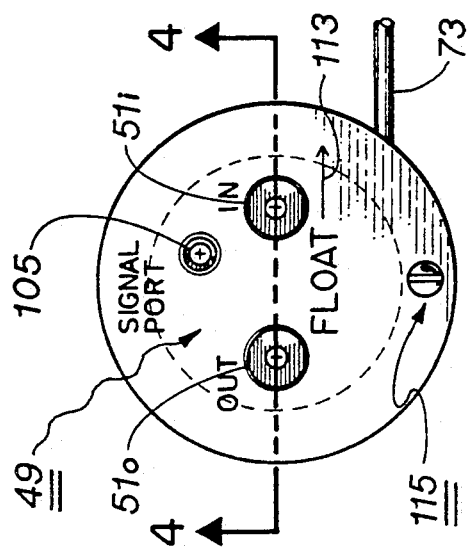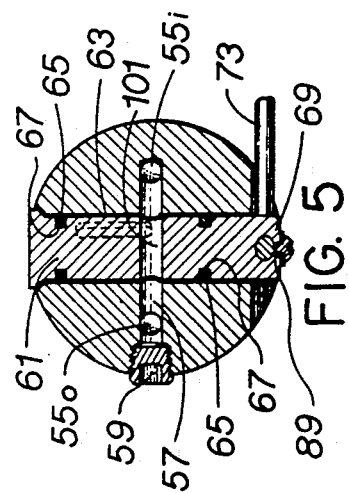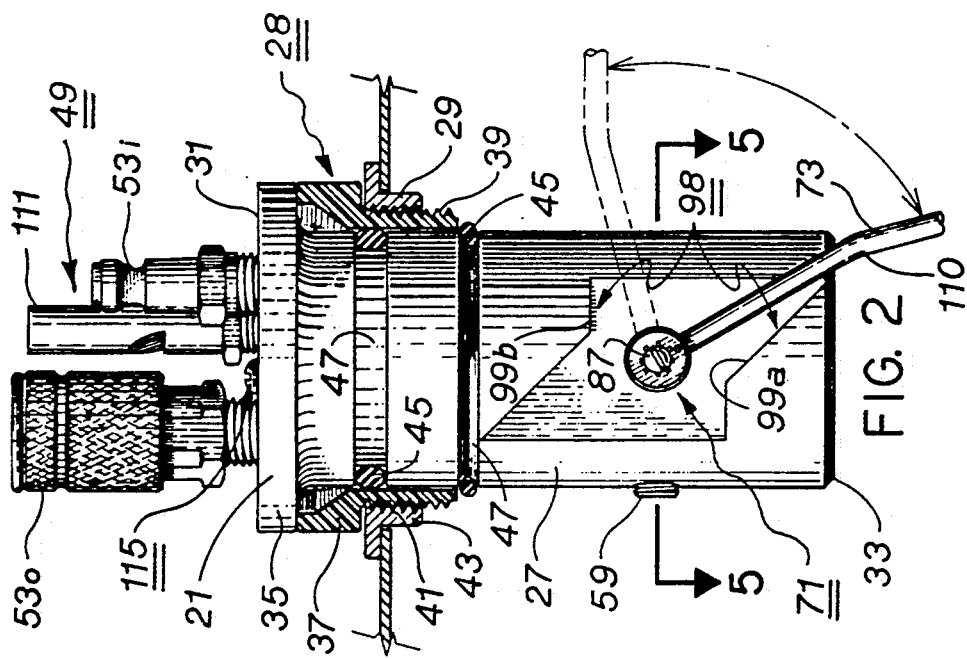

ADD-ON LIQUID OVERFLOW SHUT-OFF VALVE FOR TANK

CROSS-REFERENCE TO OTHER PATENT APPLICATIONS

This application is a continuation-in-part of my previously filed application, Ser. No. 07/538,524, filed June 15, 1990, which is now abandoned.

BACKGROUND OF THE INVENTION

1. Field of the Invention

This invention pertains to the technology of storage of liquids, including toxic liquids. More particularly, it pertains to a shut-off valve for use in pumping liquid into a storage vessel that shuts off the delivery pump when the tank becomes full.

2. Description of the Prior Art

Proper storage and handling of waste liquids, especially toxic liquids, has become very important because of the discovery that so many of them have been found to cause cancer and other serious diseases. Liquids that previously were treated as mere waste are now known to be highly dangerous to humans, as well as to the environment, and require careful and safe storage until they can be rendered harmless by further processing or become benign by passage of time.

The need to store these materials in leak-proof containers is now required by such government agencies as OSHA (Occupational Health and Safety Agency), the National Health Institute and others. A wide array of storage containers may be used, from small 1 and 2-gallon cans to large tanks, both underground and transportable. A container widely used in this situation is the standard 55-gallon drum; it is quite plentiful and its thick metal walls will safely store most materials.

These 55-gallon drums, along with other such containers, contain a standard, 2-inch diameter threaded aperture in the lid known as a "bung hole" that can be used for pouring or pumping liquid into the drum as well as to have test probes inserted thereinto for the purpose of determining various attributes of the stored liquid. Other openings are also formed in the top or lid of the drum. This same bung-hole type opening is also found in virtually all storage tanks from the very small to the extremely large. The rim of the bung hole usually contains a series of threads to accept a threaded plug known as a "bung".

One disadvantage in the use of storage tanks and drums, including the 55-gallon drum, is that they are so well sealed no light can penetrate the interior. In many cases no incandescent lamp can be safely used to aid one looking inside because the stored contents are either poisonous or highly combustible. Often the drum is pumped completely full of liquid and the pump is not shut down soon enough with the result that liquid spills out of the lid openings over the sides and onto the ground or other supporting surface to cause the toxic condition to become a problem all over again. Positioning a person to continually observe the level of fullness in the tanks raises labor costs and places him or her in a dangerous position near the toxic material.

A recent proposed change to the Uniform Fire Code states as follows:

"2-4.5 Piping and Ancillary Equipment 2-4.5.1 Means shall be provided for determining the liquid level in each tank and this means shall be accessible to the delivery operator. Provisions shall be made either to automatically stop the delivery of fuel to the tank when the liquid level in the tank reaches 95% of capacity or to sound an audible alarm when the liquid level in the tank reaches 90% of capacity."

The prior art has tried to deal with the problem of shutting off the flow of liquid into a tank, when the level reaches the uppermost safe point, but such attempts have not met with unbridled success. For instance, U.S. Pat. Nos. 559,555; 609,544; 968,362; 1,150,342; 1,427,793; 1,629,545; 1,188,535; 2,847,025; 4,493,337; and German Patent 2,148,868, as well as British Patents 20,399 and 828,125 all show float-operated shut-off valves that are mountable on a tank or boiler. However, in none of these devices may they be fully insertable through one opening, i.e., the floats are so large that they must be put inside the tank or boiler through a separate opening from that through which any other portion of the shut-off valve is inserted. In other of these devices, the liquid actually passes through the valve thereby requiring the valve to be removed, disassembled and cleaned before it can be used with other liquids.

Without portability, the devices become too costly to use. Bathing them in liquid requires dismantling and cleaning before reuse — another costly process. Further, most of these prior art devices are rigidly fixed or mounted either internal or partially internal to the tank. Such mounting eliminates them from use rapidly between drums and prevents them ±rom being used as portable or "add-on" units.

SUMMARY OF THE INVENTION

This invention is a highly versatile add-on, float-operated, liquid shut-off valve that overcomes all of the problems associated with the prior art. It is totally portable and moveable from one vessel to another with little effort. No liquid passes through the valve thus allowing it to be used with different liquids without dismantling and/or cleaning.

The invention comprises a valve body having a flange at one end for abutting against an opening in a tank and a collar positioned over the body, containing threads for matching engagement with threads formed on the inside of the periphery of the bung hole or other aperture through which it is inserted. Spaced-apart pneumatic power ingress and egress means are mounted in the flanged end of the body and are interconnected inside the body by a pair of separate passageways and separated by a shaft pivotally housed in a bore formed in the body, one end of which exits the body and interconnects through an extended arm to a float that rides on top of the liquid being pumped into the vessel. A pneumatic source is attached to the ingress means for passage of compressed gas or air through the ingress passageway to the shaft where its flow is stopped from further advance by the transverse mounted pivotal shaft.

The float is set in registration with a cross-bore formed in the shaft such that compressed gas passes from the ingress passageway through the shaft cross-bore and out through the egress passageway and out of the valve body into a liquid pump for delivering a quantity of liquid into the tank. As the float rises on top of the level of liquid in the tank, it rotates the shaft until, at the uppermost and safest level of the liquid, the shaft has turned so that it shuts off further air flow to the pump thereby shutting it down and causing a cessation of liquid delivery into the tank.

Thereafter, the collar may be easily rotated to disengage the threads for removal of the whole valve assembly from the bung hole and the valve assembly quickly moved to another location. Only the bottom of the float need be cleaned of the liquid because the valve body and all other components are suspended above and out of contact with the liquid. When the tank is drained of liquid or the valve is removed to an empty tank, the valve automatically re-sets itself; a feature not often found in the prior art.

The invention is unique in that it is especially useful in the toxic waste industry because only gas, such as air, passes through the valve and such will not jam or otherwise damage the internal workings of the valve thus reducing the cost of cleaning the shutoff valve for later re-use. Further, the invention is unique in that the float is made in a diameter that will allow it to pass through the same opening in which the valve body is inserted. The valve body, connecting arm and float are made in a unique assembly to allow them to be inserted in a fully assembled form through the standard ASTM bung hole of a 55-gallon drum for immediate use. After the tank is full, the assembly is able to be withdrawn, the outside of the float, the connecting arm and any portion of the valve body that came in contact with the liquid being stored in the drum may be easily washed and thereafter the unit may be quickly moved to another tank and reinserted for future use with the same or with a different liquid. The valve and its components are made of nonreactive metal such as stainless steel and non-sparking material such as aluminum or brass and is otherwise a safe product. Even further, certain liquids may only be pumped under a blanket of inert gas, such as carbon dioxide, and this valve operates with a wide range of compressed gasses to provide another measure of safety to the operation.

In another embodiment of this invention, the valve can be modified to provide a diversion of some of the pneumatic power from the passageway leading to the liquid pump to an audible whistle, such as an air horn, to warn the user that the tank is full and the liquid pump is shut off. This is associated with the feature of cutting off pneumatic power to the liquid transfer pump so that the tank is not overfilled while, at the same time, the user is warned that further storage will require the tank to be drained or use of another empty vessel.

Accordingly, the main object of this invention is a floatoperated, add-on valve for use in the toxic liquid storage field that is easy to install in a variety of locations about the storage tank and is useful when positioned in the top or the side of the storage vessel to cut off the flow of liquid entering a vessel to prevent overflow and thus maintain a safe and non-toxic environment. It is characterized by having the body suspended above the liquid level in the vessel and having a float that drops down below the valve body to contact the liquid thus keeping the valve body free of the liquid. Other objects include a valve whose valve body, float and float arm can be inserted in complete assembly into the standard bung holes of various tanks without disassembly or without further modification of the tank; a valve that operates independent of the liquid being pumped; a valve that does not pass the liquid therethrough so as to be free of the effects thereof, and a valve that is usable without the need of observational personnel to monitor its operation. These and other objects will become more apparent when reading the Description of the Preferred Embodiment taken together with the Drawings appended hereto., The scope of protection sought by the inventor may be gleaned from a fair reading of the claims that conclude this specification.

DESCRIPTION OF THE DRAWINGS

FIG. 2 is a side elevational, partial sectional, view of one embodiment of the valve of this invention;

FIG. 3 is a top view of the same embodiment shown in FIG. 2;

FIG. 4 is a sectional side elevational view of the valve body taken along lines 4—4 in FIG. 3;

FIG. 5 is a cross-sectional view of the valve body taken along lines 5—5 in FIG. 2;

FIG. 6 is a trimetric or illustrative view of the shaft;

DESCRIPTION OF THE PREFERRED EMBODIMENT

Figure 1:
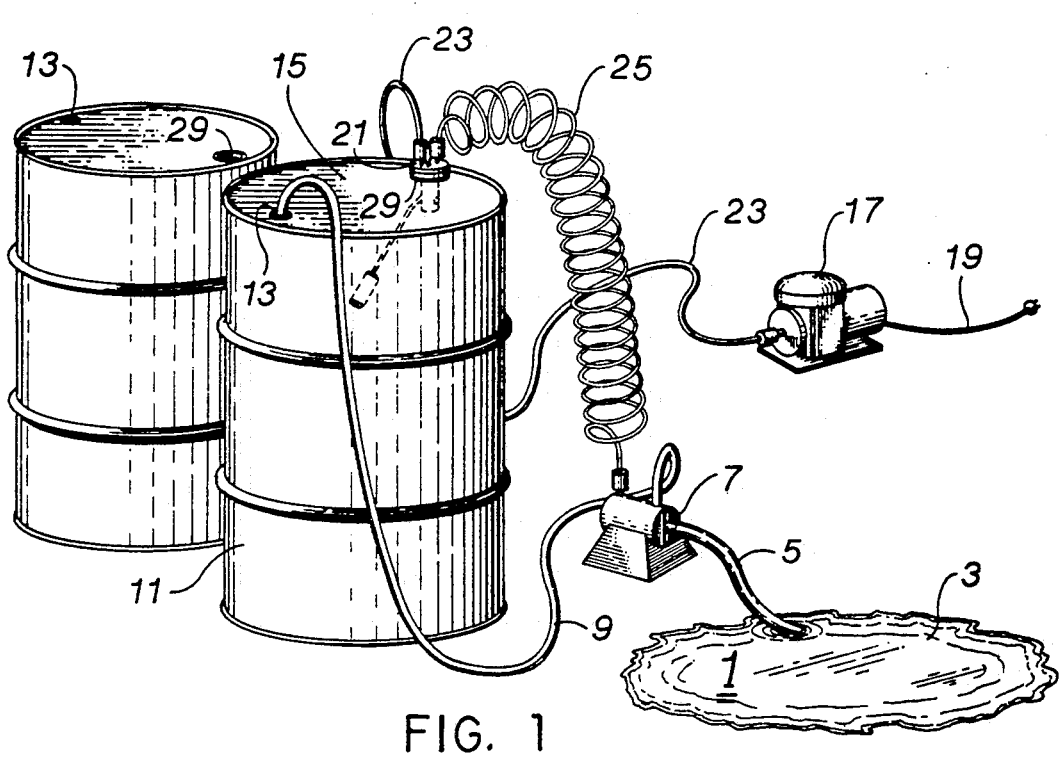
FIG. 1 is an illustrative view of the valve of this invention in use with a pump, a storage tank, a source of compressed gas and a source of toxic materials.

As shown in the drawings, where like elements are identified with like numerals throughout the eight figures, FIG. 1 shows the invention used in a typical toxic liquid storage system wherein the toxic liquid 1 is drawn from a sump 3 via a first transfer hose 5 to a pump 7 where it is pumped through a second transfer hose 9 into a standard 55-gallon drum 11 through an aperture 13 formed in the lid 15 thereof. Liquid 1 is not touched by human hands in this pumping system and the overall safety of the process is maintained. Pneumatic power, in this case air, is developed by a typical air compressor 17, powered by an electric line 19, that is delivered to pump 7 through the novel valve 21 of this invention by air transfer lines or hoses 23 and 25. As shown, valve 21 operates independent of liquid 1 and is neither contaminated thereby nor in need of cleaning after drum 11 becomes full.

As shown in FIGS. 2 through 5 and FIGS. 7 and 8, valve 21 comprises a valve body 27, preferably cylindrical in shape and of a diameter small enough to allow it to be inserted (along with its float and arm that are described later) through a standard ASTM bung hole 29 in drum lid 15. Body 27 is also preferably made of metal, such as stainless steel or brass, both for sturdiness and for inertness to liquids being pump into drum 11, as well as to create a non-spark environment.

Valve body 27 is terminated by spaced-apart first and second ends 31 and 33 respectively. At end 31 is formed an outwardly extending flange 35 for supporting valve body 27 on an attachment means 28 positioned therebelow. Preferably attachment means 28 comprises a short non-ferrous collar 37 that is provided with a series of outer threads 39, for engagement with a like series of threads 41 typically formed in bung hole periphery 43, and is held in sealed engagement with valve body 27 by 0-ring 45 retained in a seal groove 47. Valve body 27 may be easily inserted in bung hole 29 and collar 37 twisted to engage threads 39 and 41 to mount valve 21 rigidly therein.

Means 49 for providing pneumatic ingress and egress to valve body 27 is formed in valve body first end 31 in spaced-apart relation for connection respectively to air compressor 17 and pump 7. As shown, means 49 includes a pair of threaded apertures 51i and 51o, formed in first end 31 wherein "i" indicates an inlet for compressed gas and "o" indicates an outlet for same. Female quickdisconnect type fitting 53o and male quick-disconnect type fitting 53i are threadably received in apertures 51i and 51o respectively for later receipt of similar respective male- and female-type fittings that are connected to first and second transfer hoses 23 and 25.

A pair of first and second spaced-apart pneumatic passageways 55i and 55o are formed interior of valve body 27, preferably in parallel, spaced-apart arrangement as shown, for interconnecting ingress and egress means 49 and are interconnected by a third passageway 57 positioned transverse between the ends thereof and containing a clean out plug 59. A shaft 61 is pivotally received in a shaft bore 63, formed in valve body 27, for intercepting third pneumatic passageway 57 and is journaled in a pair of spaced-apart O-rings 65 that are in turn seated in grooves 67 formed in shaft 61. Other such sealing means are contemplated in lieu of O-rings 65 and are within the scope of this invention. Shaft 61 is preferably set in axial alignment parallel to the plane of drum lid 15.

Figure 7:
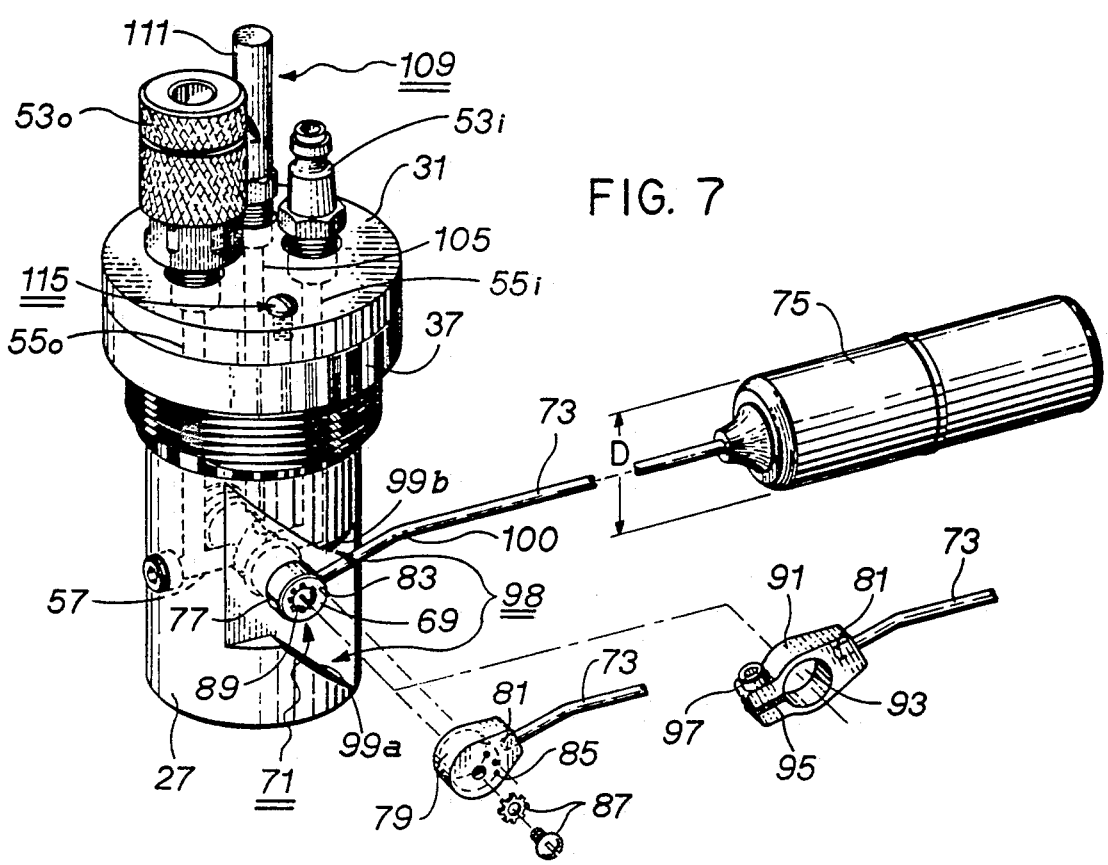
FIG. 7 is an illustrative view of another embodiment of the valve body.
Figure 8:
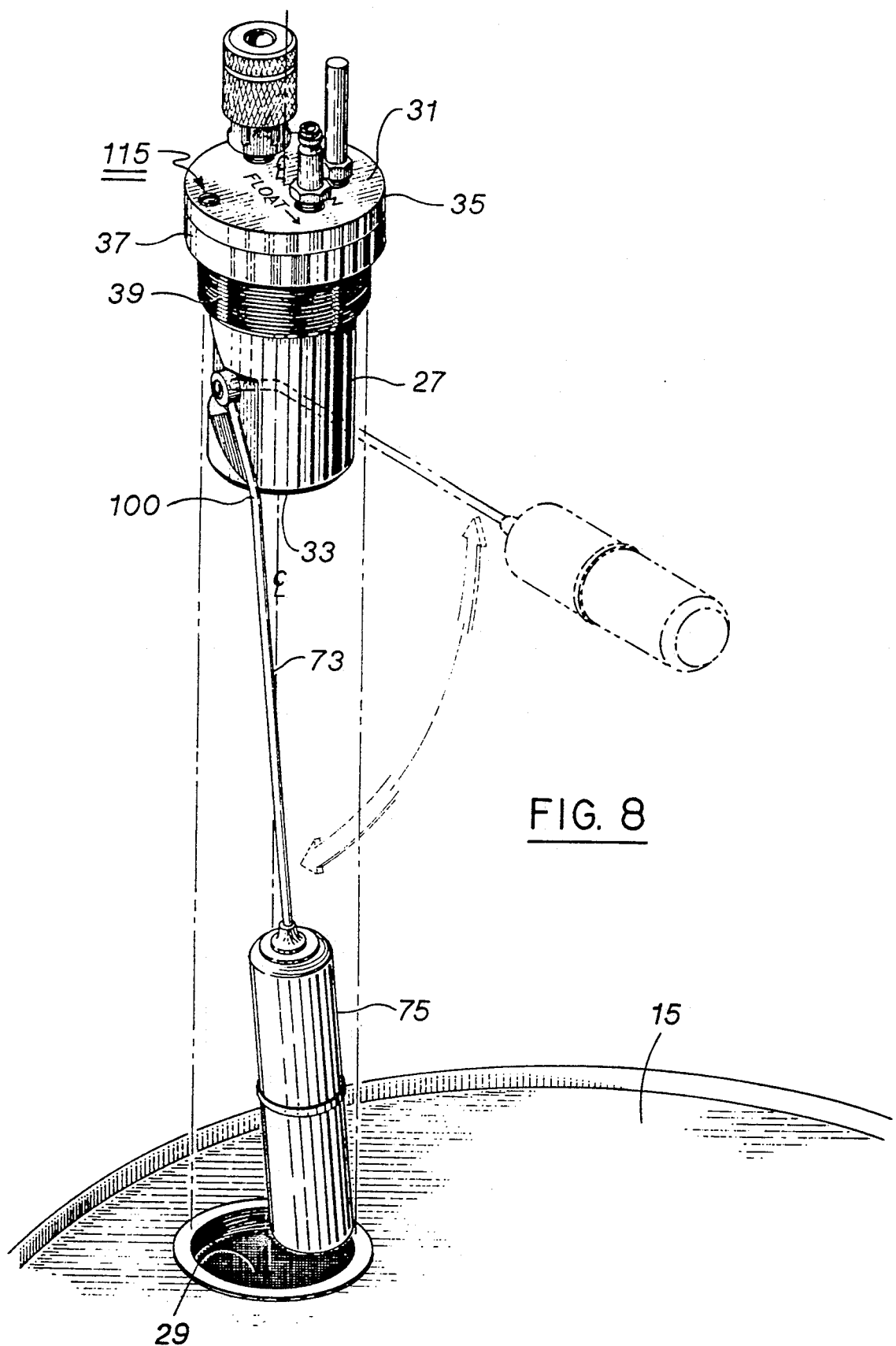
FIG. 8 is an illustrative view of the preferred embodiment insertable in fully assembled form in a standard ASTM bung hole in a typical drum and, in phantom, the path of movement of the float and arm.

Shaft 61 is terminated by a first shaft end 69 that extends outside valve body 27 and is adapted to be attached through connection means 71 to an arm 73 that is in turn attached to a float 75 adapted to float upon the surface of liquid 1. Connection means 71 may be chosen from a wide variety of means shown in FIG. 7 including a cross-bore 77 formed in shaft end 69 through which arm 73 is inserted. Other means are shown in FIG. 7 including an end-cap 79 in which the end 81 of arm 73 is mounted, said end cap 79 arranged for attachment with pins 83, received in pin holes 85 formed in end-cap 79 and held therein by receipt of a threaded bolt with lock washer 87 in a threaded aperture 89 formed in shaft end 69.

A still further means of attaching arm 73 to shaft end 69 is by the use of a clamp 91 in which arm end 81 is mounted, said clamp containing an aperture 93 for receipt of shaft end 69 and further containing a slot 95 and a bolt 97 received transverse thereto for tightening clamp 91 about shaft end 69. These means allow float 75 and arm 73 to be adjusted with respect to shaft 61 to activate valve 21 to shut off air flow at different levels of liquid in drum 11.

Float 75 Is made tubular in overall length having a diameter "D" slightly less than the diameter of bung hole 29. Further, arm 73 contains a bend 100 that permits it to be assembled, along with valve body 27 and float 75 into an elongated configuration, shown in FIG. 8, that is readily insertable through bung hole 29.

It is preferred to limit the movement of arm 73 and float 75 to a predetermined path so that insertion of the fully assembled add-on valve into the dark interior of the tank will not be in such a manner as to have the float rise on the top of the liquid and contact the sidewall of the tank such that the valve will not shut off when the liquid has reached the predetermined level. To insure that float 75 is confined to the predetermined path and not move across the vertical center line C—C of valve body 27, means 98 is employed as shown in FIGS. 2 and 7. Means 98 comprises a first abutment 99a formed on valve body 27 and extends outward therefrom to intercept arm 73 during movement thereof, i.e., as it is lowered to prevent arm 73 and float 75 from moving below the lowermost portion of the predetermined path that is shown in phantom in FIG. 8. Means 98 also includes a second abutment 99b formed in valve body 27 and extending outward therefrom to intercept arm 73 during movement thereof, i.e., as float 73 raises on the liquid being pumped into the tank, to prevent arm 73 and float 75 from moving beyond the uppermost portion of the aforesaid predetermined path.

A fourth pneumatic passageway 101 is formed in shaft 61, intersecting third pneumatic passageway 57, preferably transverse of the long axis thereof, having openings or apertures 103i and 103o that register with intersected third pneumatic passageway 57 during the rotation of shaft 61 from the rising level of liquid in drum 11. When the level of liquid 1 reaches the uppermost level desired in drum 11, pneumatic passageway 101 passes out of registration with third intersecting pneumatic passageway 57 thereby interrupting the flow of compressed gas from compressor 17 to pump 7 and stopping the influx of any more liquid into drum 11. Connection means 71 is strategically positioned between shaft 61 and float arm 73 to adjust the position of arm 73 with air passageway apertures 103i and 103o so that the uppermost level of liquid in the drum may be adjusted at will.

While air passageway 101 is preferred to be merely formed or bored transverse to the long axis of shaft 61 it can be offset in different directions and, further, may comprise more than one passageway and still come within the spirit and scope of this invention.

While the above-described invention works very well, there is no indication that the level of liquid 1 has risen in drum 11 to the desired level or that pumping has ceased except for a change in the noise level of air passing through transfer hoses 23 and 25. To remedy this situation, another embodiment of this invention is to utilize a fifth air passageway 105, formed in valve body 27, extending from body top end 31 down to intersect bore 63 at a point spaced apart from third passageway 57. A separate, sixth pneumatic passageway, in the form of a groove 107, is formed in shaft 61 for interconnection with incoming air from first passageway 55i and third passageway 57 and is adapted to register with fifth passageway 105 when the air is shut off from outgoing passageway 55o.

A signal means 109, such as an audible whistle 111, is operably connected to fifth passageway 105 and remains dormant during operation of the invention while liquid 1 is below the uppermost desired level. When float 75 is raised by the liquid to the uppermost desired level, fourth pneumatic passageway 101 rotates on shaft 65 out of registry with third pneumatic passageway 57 to shut down pump 7 simultaneous with rotation of groove 107 into registration with fifth pneumatic passageway 105 passing pneumatic power to whistle 111. Accordingly, as pump 7 is deprived of compressed gas and stops pumping liquid 1 into drum 11, whistle 111 is activated by the compressed gas and calls attention to the operator that drum 11 is now full and the pumping has ceased. Another waste drum 11 may then be quickly rolled into position, valve body 27, arm 73 and float 75 removed from the full drum and installed on the new, empty drum 11. As can be appreciated, signal means 109 may take a wide variety of forms and yet remain within the spirit and scope of this invention.

Since arm 73 and float 75 are shielded from view after being inserted in drum 11, it is preferred to have some indication of the orientation of valve body 27 vis-a-vis float 75. For this reason, visual indicia such as the picture of an arrow and the word, "float", shown at 113 is engraved or otherwise affixed to the upper surface of first valve body end 31 as shown in FIG. 3 so that valve body 27 may be easily and readily properly oriented in bung hole 29. Further visual indicia in the form of words, "in" and "out" are affixed to the upper surface of first valve body end 31 adjacent respective apertures 51i and 51o to aid the operator in knowing which aperture to affix the respective pneumatic lines.

Because collar 37 is preferably made of non-ferrous material, there is always the potential for the accumulation of a static charge on valve body 27 during the passage of compressed air or other gas therethrough. As a precaution, means 115 is provided for connecting valve body 27 to an electrical ground. As shown in FIG. 3, means 115 may conveniently take the form of a bolt, machine screw or other device threadably received in first valve body end 31 for connection via an electrical cable or wire to an appropriate electrical ground.

What is claimed is:

1. An add-on liquid overflow shut-off valve for a tank comprising:
    (a) A valve body, a moveable float spaced-apart therefrom and a connecting arm extending therebetween, all adapted for insertion and removal as one integral, portable unit through a standard tank lid opening for suspension below said opening so that said float is responsive to the liquid level in the tank, said valve body including a flanged portion extending exterior of the tank lid opening to receive connections from a pneumatic source and to a pneumatic driven pump;
    (b) pneumatic ingress and egress means formed in said top flanged portion of said valve body in spaced-apart relation for passing only gas through said valve;
    (c) spaced-apart first and second pneumatic passageways formed interior of said valve body extending respectively from said ingress means and said egress means;
    (d) a third pneumatic passageway formed interior of said body interconnecting said first and second passageways to allow a flow of gas therethrough;
    (e) a shaft pivotally received in said body, interrupting said third pneumatic passageway, having a fourth pneumatic passageway formed therethrough for pneumatic alignment with said third pneumatic passageway when the liquid is below a predetermined level in the tank, said shaft having one end thereof extending outside said valve body for connection to said arm;
    (f) said connecting arm causing rotation of said shaft as a function of said float movement on top of the liquid in the tank, to align said fourth pneumatic passageway with said third pneumatic passageway when the liquid is below the predetermined level, to allow gas to flow from said ingress means through said first, second, third, and fourth pneumatic passageways to said egress means to drive the pump and continue to deliver liquid into the tank, and then to rotate into a position wherein said fourth pneumatic passageway rotates out of alignment with said third pneumatic passageway shutting off the gas flow to the pump when the liquid reaches the predetermined level, said valve body, float and connecting arm able to be withdrawn as a unit from the filled tank through the tank opening for immediate insertion into another tank for subsequent use; and,
    (g) means for connecting said valve body to an electrical ground.

2. The add-on liquid overflow shut-off valve of claim 1 further including a bend in said arm to allow said valve body, said arm and said float, in fully-assembled configuration, to be aligned for insertion and removal through the standard tank opening.

3. The add-on liquid overflow shut-off valve of claim 1 further including means for limiting the travel of said float to insure that its movement is confined to a predetermined path.

4. The add-on liquid overflow shut-off valve of claim 3 wherein said means for limiting the travel of said float includes a first abutment formed on said valve body adapted to intercept said arm during movement thereof and prevent said float from moving outside the lowermost portion of its predetermined path.

5. The add-on liquid overflow shut-off valve of claim 3 wherein said means for limiting the travel of said float includes a second abutment formed on said valve body adapted to intercept said arm during movement thereof and prevent said float from moving outside the uppermost portion of its predetermined path.

6. The add-on liquid overflow shut-off valve of claim 3 wherein said means for limiting the travel of said float includes a first and second abutment formed on said valve body adapted to intercept said arm during movement thereof and prevent said float from moving outside the uppermost and lowermost portions of its predetermined path.

7. The add-on liquid overflow shut-off valve of claim 1 further including visual indicia affixed to said flanged end of said body for indicating the side of said valve body on which said float will rise while liquid is being transferred into the tank.

8. The add-on liquid overflow shut-off valve of claim 1 wherein said means associated with said flanged end includes a collar slidingly mounted on said body below said flange and having formed exterior thereabout a series of threads for matching engagement with a similar set of threads formed about the periphery of said opening to anchor said body securely in the lid of the tank.

9. The add-on liquid overflow shut-off valve of claim 8 further including an O-ring interposed between said collar and said valve body, in a circumferential groove formed about said body, to seal the space between said collar and said valve body.

10. The add-on liquid overflow shut-off valve of claim 1 wherein said body, said arm and said float are of a size to fit through a standard ASTM bung hole on the lid of a drum.

11. The add-on liquid overflow shut-off valve of claim 1 wherein said first and second pneumatic passageways are formed in parallel, spaced-apart relation and extend down into said valve body terminating therein to remain totally confined within said body.

12. The add-on liquid overflow shut-off valve of claim 1 wherein said pneumatic ingress and egress means further includes a male quick-disconnect type fitting and a female quickdisconnect type fitting respectively connected thereto for connection to pneumatic transfer hoses that are connected to the pressurized pneumatic source and pneumatic-driven liquid pump.

13. The add-on liquid overflow shut-off valve of claim 12 wherein said shaft is contained in a bore formed transverse to and interconnected with said first and second pneumatic passageways.

14. The add-on liquid overflow shut-off valve of claim 13 wherein the longitudinal axis of said shaft is parallel to the plane of the lid of the tank.

15. The add-on liquid overflow shut-off valve of claim 13 wherein said shaft includes seal means to prevent unwanted escape of pneumatic power from between said shaft and said bore.

16. The add-on liquid overflow shut-off valve of claim 15 wherein said seal means includes spaced-apart O-rings retained in circumferential grooves formed in said shaft bore.

17. The add-on liquid overflow shut-off valve of claim 1 further including means for adjusting said arm with said shaft for changing the level of liquid in the tank at which the shaft rotates far enough to shut off the pneumatic power to the pneumatic pump.

18. The add-on liquid overflow shut-off valve of claim 17 wherein said means for adjusting said arm includes a cross-pin received in matching passageways formed in said arm and said shaft.

19. The add-on liquid overflow shut-off valve of claim 17 wherein said means for adjusting said arm includes an end cap in which said arm is mounted, for receipt on said exterior end of said shaft and further including a plurality of inter-fitted attachment pins and pin apertures formed in said shaft end, said cap retained on said shaft end by a threaded bolt.

20. The add-on liquid overflow shut-off valve of claim 17 wherein said means for adjusting said arm includes a clamp, in which said float arm end is mounted, said clamp containing an aperture for receipt therein of said shaft end and further containing a slot and a bolt received transverse to said slot for tightening said clamp about said shaft end.

21. The add-on liquid overflow shut-off valve of claim 1 further including a signal means that is activated by pneumatic power shut off from said pneumatic egress means to alert the operator to the fact that the level of liquid has reached the upper predetermined level in the tank.

22. The add-on liquid overflow shut-off valve of claim 21 wherein said signal means includes a pneumatically activated whistle.

23. The add-on liquid overflow shut-off valve of claim 21 wherein said signal means includes a separate pneumatic passageway formed in said valve body interfacing with said shaft and a passageway in said shaft for delivery of pneumatic power from said ingress means and an audible device connected exterior of said valve body to said pneumatic passageway for activation by the pneumatic power when said shaft rotates such that pneumatic power is no longer provided to the liquid pump.

24. The add-on liquid overflow shut-off valve of claim 1 further including means for connecting said shut-off valve to an electrical ground.

* * * * *